Figure 1:
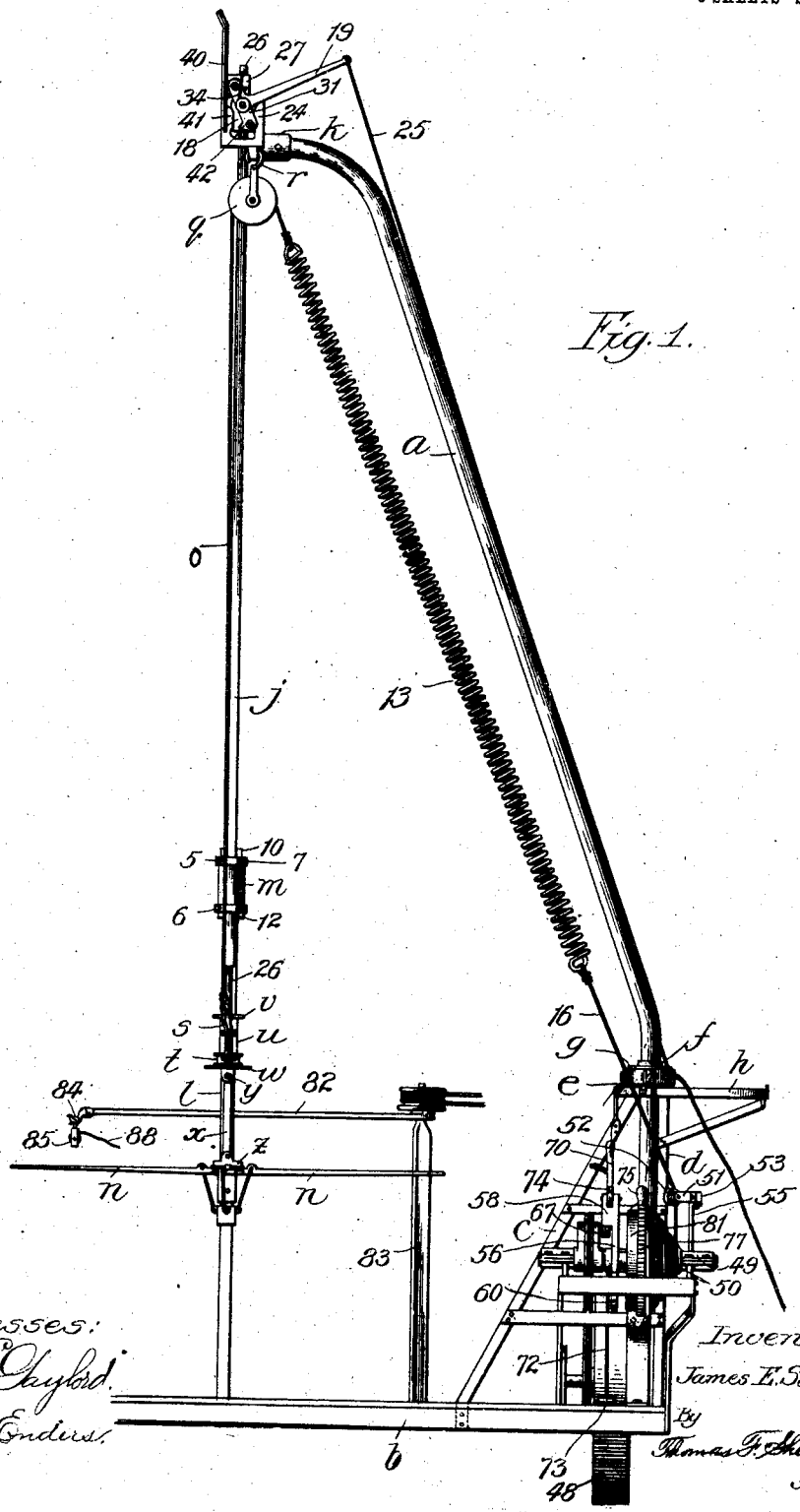

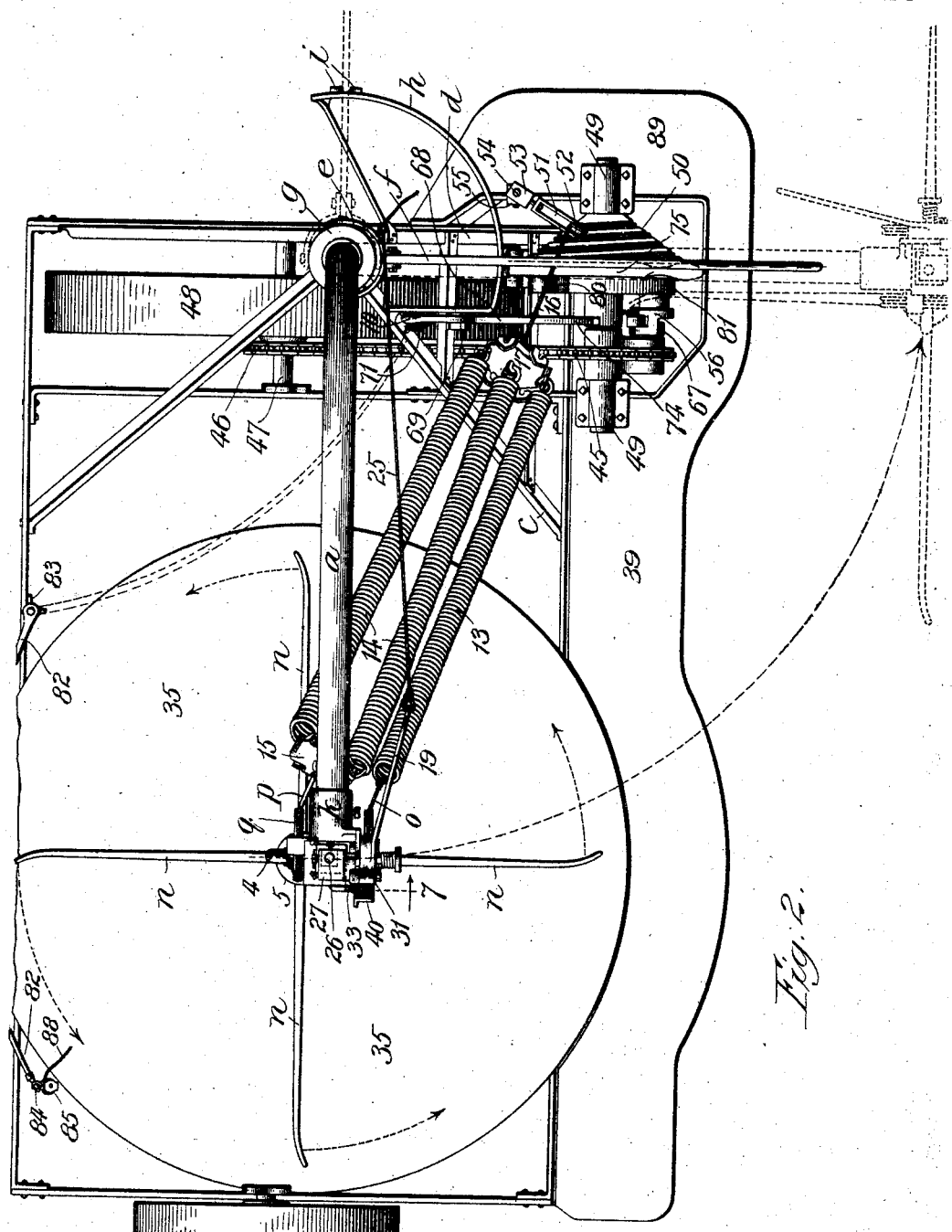

No. 854,059. PATENTED MAY 21, 1907.
J. E. SIMMONDS.
CORN SHOCKING MECHANISM.
APPLICATION FILED MAY 16, 1904.
6 SHEETS—SHEET 3.
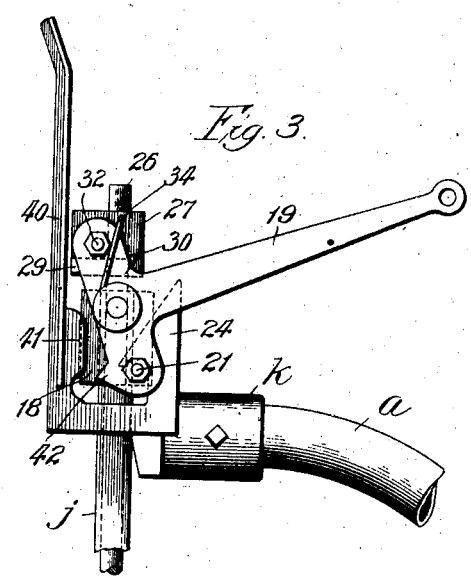
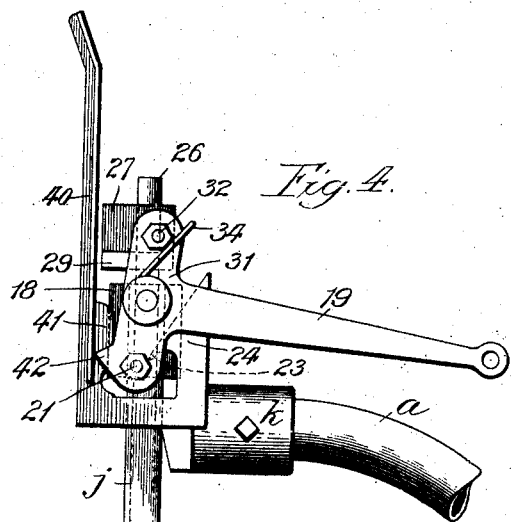
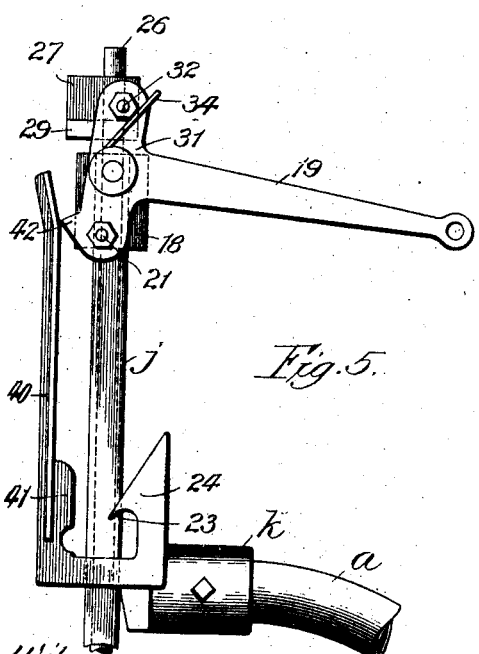
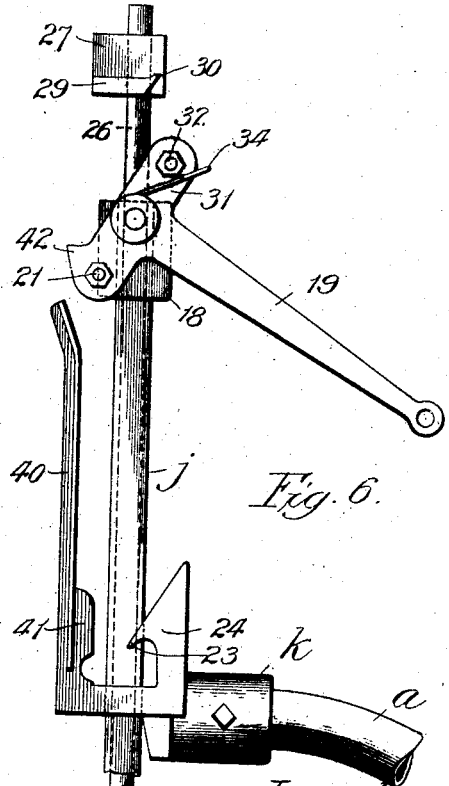
Witnesses:
Chas. E. Saybold.
John Enders
Inventor:
James E. Simmonds,
By Thomas F. Sheridan,
Att'y

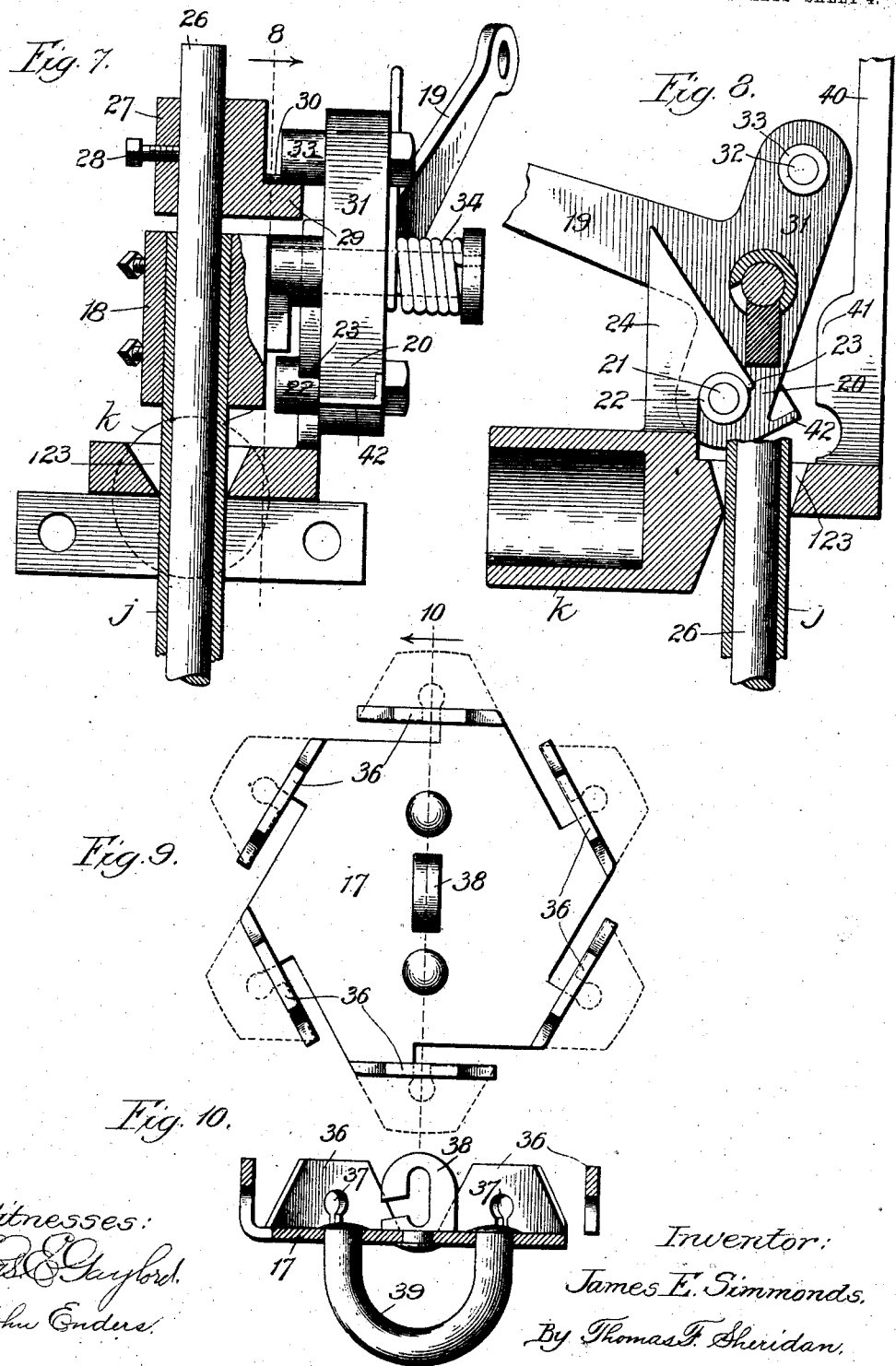

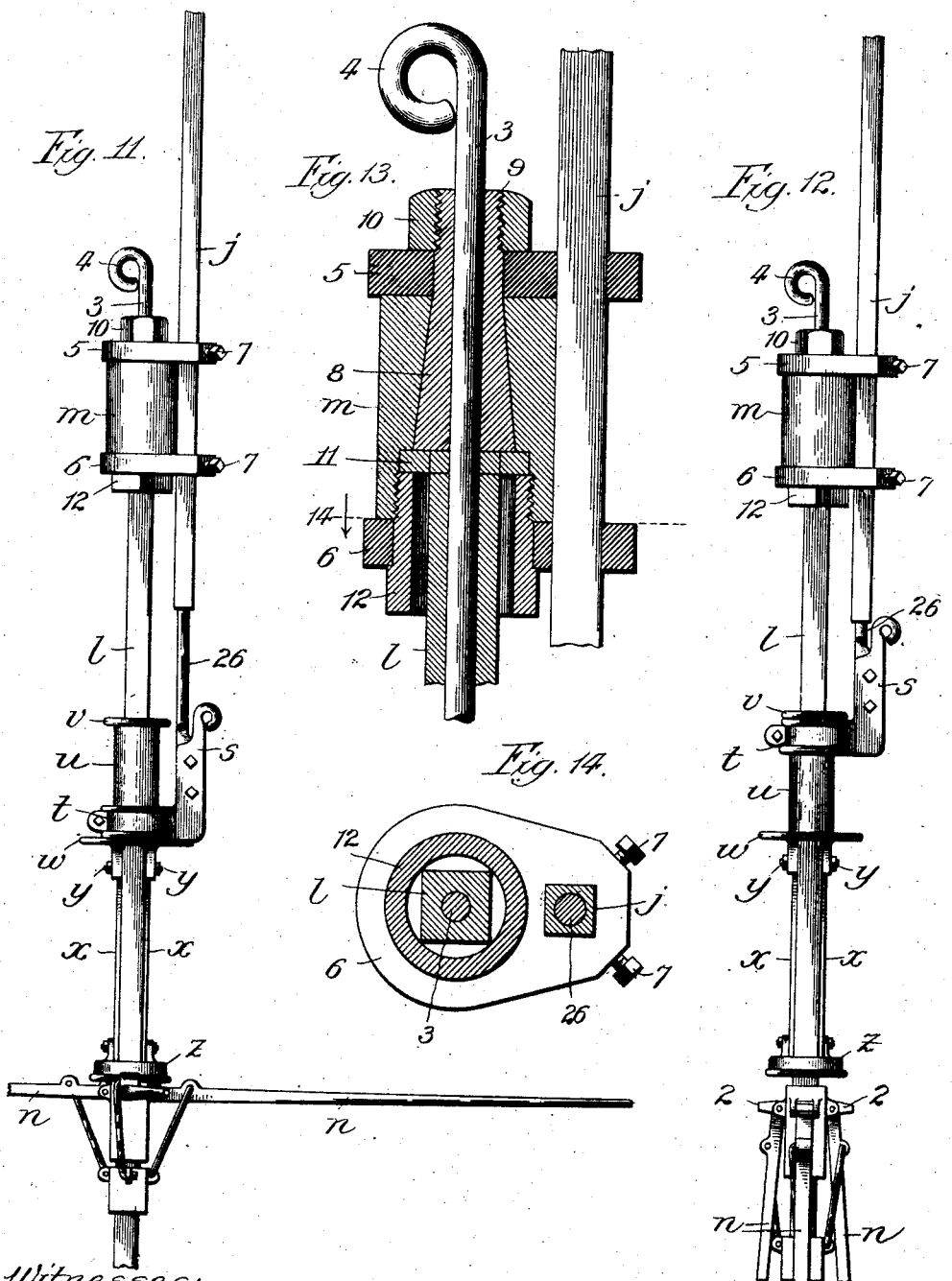

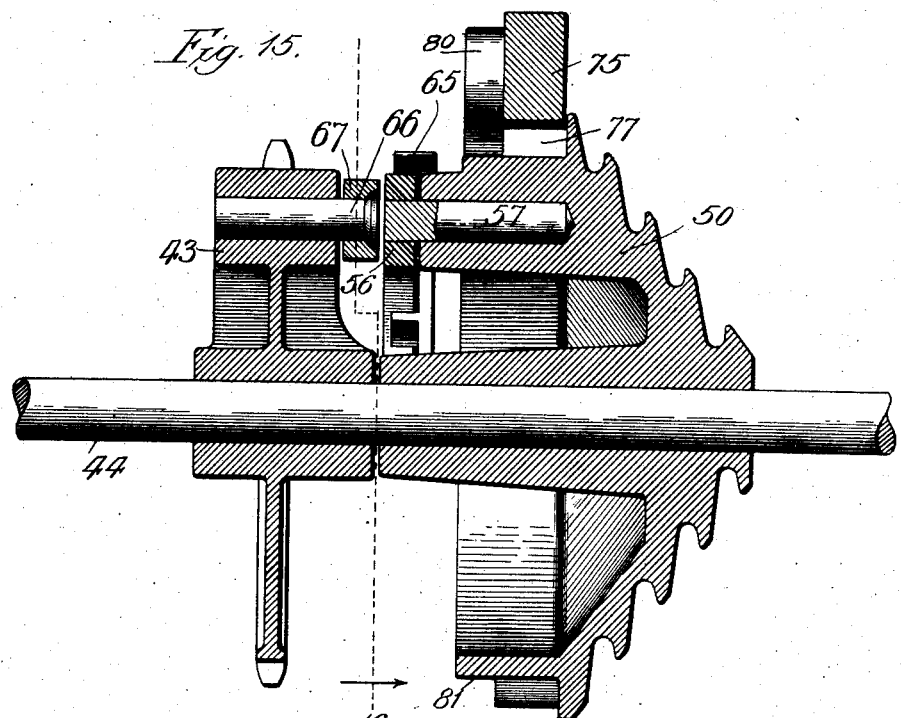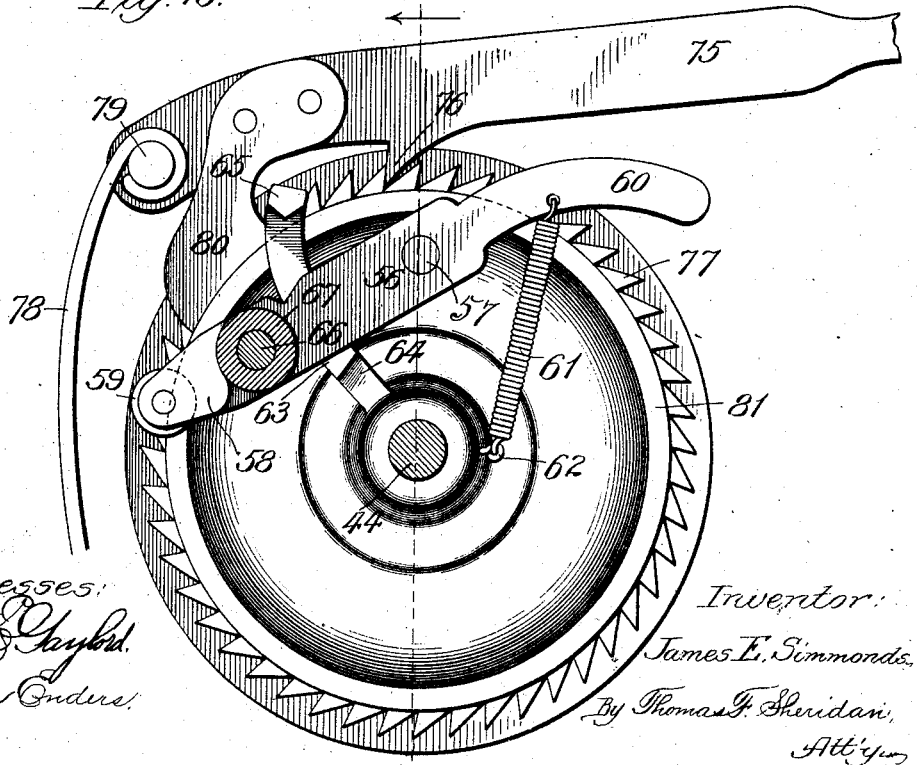

UNITED STATES PATENT OFFICE.

JAMES E. SIMMONDS, OF CAMP POINT, ILLINOIS.

CORN-SHOCKING MECHANISM.

No. 854,059.　　　　Specification of Letters Patent.　　　Patented May 21, 1907.

Application filed May 16, 1904. Serial No. 208,222.

*To all whom it may concern:*

Be it known that I, JAMES E. SIMMONDS, a citizen of the United States, residing at Camp Point, in the county of Adams and State of Illinois, am the inventor of certain new and useful Improvements in Corn-Shocking Mechanisms, of which the following is a specification.

My invention relates to that class of corn cutting and shocking machines provided with an upright supporting arm or crane mounted on the frame thereof and having shock suspending mechanism mounted at the upper end thereof.

The principal object of my invention is to provide a simple, economical and efficient corn shocking machine.

A further object of the invention is to provide a corn shocking device with means operating automatically upon being released or tripped to raise the shock from the position in which it is built, and provided with means for carrying it to the desired position with relation to the machine and withdrawing the shock supporting arms therefrom to cause the shock to drop in the desired position.

A further object is to provide,—in a corn shocking mechanism having a portable crane, suitable means for engaging and suspending the shock and spring mechanism for raising the shock suspending mechanism,—means for winding such spring mechanism to a tension, means for holding the shock supporting mechanism against the tension of the spring mechanism and releasing it when desired, and means for holding the spring mechanism at a tension, so as to permit such spring mechanism to automatically raise the shock at one step in the operation and automatically disengage the shock supporting mechanism from the shock to drop it at another step in the operation upon properly releasing or tripping the mechanisms for raising and dropping the shock.

It is particularly desirable that means be provided whereby the releasing of the shock raising and shock dropping mechanisms may be accomplished by means of the same tripping cord or lever, such lever being connected with suitable mechanism for locking and releasing the parts consecutively as desired. It is also desirable that means be provided whereby the full strength of the spring mechanism for raising the shock need not be applied to the releasing mechanism in disengaging the shock.

A further object of the invention is to provide suitable means for operatively connecting the winding mechanism with the master-wheel of the machine and disconnecting it therefrom.

A further object is to provide simple and efficient means for passing the end of the shock compressing and binding cords around the shock a sufficient distance to permit the operator to completely encircle the shock with such cords without descending from the machine or walking around the shock.

Other and further objects of the invention will appear from an examination of the drawings and the following description and claims.

The invention consists in the features, combinations and details of construction hereinafter described and claimed.

In illustrating and describing my invention I have shown and described only that which is new, taken with so much that is old as is necessary to enable those skilled in the art to make and practice the invention.

In the accompanying drawings—Figure 1 is a rear elevation of a portion of a corn cutting and shocking machine provided with my improvements; Fig. 2 a plan view thereof; Fig. 3 a detail elevation showing the shock suspending rod or shaft members at the point where they are connected with the head of the crane and the detent lever mechanism for locking and releasing the parts, all in their initial position as they would appear during the building of the shock; Fig. 4 a similar view showing the parts illustrated in Fig. 3 with the locking lever tripped at the first trip to permit the shock to be raised; Fig. 5 a similar view showing the parts illustrated in Fig. 3 during the act of raising the shock; Fig. 6 a similar view of these parts as they appear after tripping the shock engaging mechanism to release and drop the shock, or after the second tripping of the detent lever; Fig. 7 a side elevation of the parts shown in Fig. 3; Fig. 8 a sectional elevation, taken on line 8 of Fig. 7; Fig. 9 a detail view of one of the actuating spring plates showing the form of the blank in dotted lines; Fig. 10 a sectional view of such spring plate, taken on line 10 of Fig. 9; Fig. 11 a view in elevation of the lower portion of the shock suspending mechanism, shown in Fig. 1, with the lower portion of the spindle broken away showing the parts in their initial position; Fig. 12 a similar view showing the parts after being tripped to disengage the suspending mechanism from the shock and permit the shock to be dropped; Fig. 13 a detail sectional elevation of the bearing in which the shock supporting spindle is mounted and by means of which it is connected with the slidably mounted shock suspending member or shaft; Fig. 14 a sectional plan view of the parts shown in Fig. 13, taken on line 14 of said figure. Fig. 15 a detail sectional view in elevation, showing the winding wheel and sprocket; and Fig. 16 a detail in elevation, taken on line 16 of Fig. 15 looking in the direction of the arrow and showing the mechanism for connecting and disconnecting the winding wheel and sprocket.

In constructing a device in accordance with my improvements, I provide a shock supporting arm or crane $a$, which is rotatably mounted upon the frame $b$ of an ordinary corn cutting and shocking machine of any desired type,—braces or standards $c$ and $d$ being provided with a suitable bearing portion for holding such crane in upright position and permitting the rotation thereof. A suitable crane operating lever $f$ is pivotally connected to a collar $g$, which is mounted in fixed relation to the crane, and a segment $h$ is provided with shoulders $i$, forming suitable slots for retaining the crane operating lever and thereby the crane in the desired position. The crane is in the position shown in full lines in Figs. 1 and 2, while the shock is being built, and in the position shown in dotted lines in Fig. 2 when the shock is to be dropped. When the crane is rotated to the position shown in dotted lines in Fig. 2, to permit the dumping of the shock, the weight of the shock tilts the machine sufficiently to swing it backward the necessary distance to permit it to be dropped without coming in contact with the frame.

Shock suspending mechanism is provided, comprising a preferably hollow square tube or shaft $j$, which is slidably mounted in the head portion $k$, of the crane, and a spindle $l$ is rotatably mounted in a suitable spindle bearing $m$, which is connected to the slidably mounted tube or shaft member $j$,—collapsible rams $n$, being provided and mounted upon the rotatable spindle for engaging the shock and permitting it to be dropped as hereinafter described. The shock suspending mechanism is also provided with flexible elements in the form of chains or cables $o$ and $p$, which are mounted upon the outer end of the crane in suitable pulleys $q$, which are attached to the head portion of the crane by means of suitable hooks $r$. The cable $o$ is attached to an arm $s$ of a ring $t$, such ring being slidably mounted upon a sleeve $u$, having an upper flange $v$, and a lower flange $w$. This sleeve is connected to straps or rods $x$ by means of bolts $y$,—such straps or rods being in turn connected to a ring $z$ mounted at the lower ends thereof and movable into and out of engagement with studs 2 upon the collapsible arms $n$. The chain or cable $p$ is mounted in a pulley upon the outer end of the crane in a manner similar to the arrangement of the cable $o$, and is connected to the sliding hollow tube or shaft $j$ near its lower end by means of a rod 3, having an eye portion 4, for receiving the end of such chain or cable. This eye rod is mounted in a shell or shock spindle bearing portion $m$—above mentioned—which is connected to the sliding shock suspending member $j$ by means of upper and lower rings 5 and 6, which are held in position upon the hollow tube or shaft by means of set screws 7. The main body portion or shell of the bearing $m$ is provided with a conical bore in which is mounted a conical inner sleeve 8, having a longitudinal slot—not shown—for permitting it to be compressed tightly into engagement with the eye rod 3, which extends therethrough. This sleeve is provided at its upper end with screw threads 9, a nut 10 being mounted in threaded engagement therewith upon the outside of the upper ring 5 through which the sleeve extends, so that by tightening the nut the conical sleeve is drawn upward into the cone-shaped bore of the shell portion of the bearing into rigid engagement with the eye rod.

By this arrangement it will be seen that the necessary rigidity and strength of the parts is obtained to enable the chain or cable $p$ to support the weight of the shock, or such portion thereof as it is required to support in connection with the cable $o$. The shock supporting spindle $l$ is provided at its upper end with an annular flange portion 11, which is rotatably mounted in the axial perforation of the bearing $m$ and held in place by means of a ring 12, which is mounted in threaded engagement with the lower end of the main body portion of the bearing and extends through the lower ring. By means of this arrangement, the shock supporting spindle is rotatably connected with the sliding rod or shaft portion $j$ of the shock suspending mechanism. The cable $p$, being connected to the sliding hollow tube or shaft $j$, serves to raise the greater portion or, if desired, the entire weight of the shock. The cable $o$ serves to raise a relatively small portion of such weight, being provided principally for the purpose of raising the ring $z$ out of engagement with the collapsible arms which support the shock so as to permit them to drop the shock when desired, as will more fully hereinafter appear.

Actuating spring mechanism is provided comprising a spring 13, which is connected to the cable $o$, and a gang of springs 14 connected to the cable $p$ by means of a spring plate 15, all of such springs being preferably connected to the winding cable 16 by means of a spring plate 17, so that when such springs are wound to a tension, they will serve to automatically raise the shock suspending mechanism above described and thereby the shock and to disengage such shock supporting mechanism from the shock when properly released or tripped for each of these movements. By means of these springs and the spring winding mechanisms hereinafter described, the power necessary to raise the shock supporting mechanism and thereby the shock is enabled to be stored so that when the parts are released the shock will be automatically raised by the force of the springs and the shock also automatically dropped or disengaged when desired. It, therefore, becomes desirable and necessary to provide suitable means for holding the shock suspending mechanism in the desired position with relation to the crane against the action of the springs when they are wound to a tension, and for releasing such shock supporting mechanism to permit it, and thereby the shock, to be raised automatically by the force of the springs when desired. It is also necessary to provide suitable means for enabling the spring mechanism to automatically disengage or release the shock by simply tripping or releasing that portion of the spring mechanism which operates to perform this function. It is also desirable—as already suggested—that the tripping or releasing, which enables the shock to be raised by the spring mechanism and also that which permits the releasing of the shock, be accomplished by means of a single cord or tripping lever connected with suitable mechanisms for holding the parts in position and permitting their release.

In order to provide suitable means for holding the shock supporting mechanism against the action of the actuating springs which raise the shock, and for releasing the shock supporting rod or shaft $j$, so as to permit its upward movement with relation to the crane when desired, I provide a suspending shaft head 18, which is mounted at the upper end of the hollow tube or shaft $j$ and above the head portion of the crane—as shown in Fig. 7. Suitable detent mechanism comprising a bell crank detent lever 19 is pivotally mounted upon this head and provided with a lever arm 20, having a detent stud 21, provided with an anti-friction sleeve portion 22, adapted to engage the shoulder or hook portion 23 of a keeper 24, which keeper is mounted upon and forms a portion of the head $k$ of the crane already described. The crane head is further provided with a beveled perforation 123 through which the hollow tube or shaft portion of the shock suspending mechanism extends. It will be seen that the shock suspending mechanism is thus held down against the tension of the actuating spring mechanism and that the same will be prevented from moving upward with the shock until the detent stud 21 is released from engagement with the hook or keeper 24. In Figs. 3 and 8 these parts are shown in position to hold the suspending frame in initial position against the tension of the actuating spring mechanism. A pull upon the tripping cord 25, which is attached to the outer end of this bell-crank detent lever throws such locking lever into the position shown in Fig. 4, thus releasing it from the keeper or hook and permitting it to be raised to the position shown in Fig. 5 and pass on upward to the desired height. The shock is thus raised into position to be swung with the crane to the point from which it is to be dropped. When the shock has been swung back into position to be dropped it becomes necessary to disengage the collapsible arms $n$ therefrom, and it is, as already suggested, desirable that this be accomplished by means of the same tripping cord and tripping or detent lever mechanism already employed for the purpose of permitting the shock to be raised. In order to accomplish this, a rod 26, which may be termed a trigger rod, is passed through the hollow portion of the tube or shaft $j$ in which it is slidably mounted. Its lower end is connected to the ring $t$ by means of the arms $s$, already described,—and thereby to the collar or ring $z$ which controls the collapsible shock engaging arms $n$. The upper end of the "trigger" rod is provided with a head 27—as clearly shown in Figs. 3 and 7. This head is firmly held in position upon the rod by means of a set screw 28 and is provided with a locking lug or shoulder 29 having an upwardly inclined receiving end portion 30. The bell-crank detent lever is provided with a locking lever arm 31, having a stud 32, which is provided with an anti-friction sleeve portion 33, adapted to engage this locking lug or shoulder of the trigger rod and hold such rod down against the tension of the spring 13 which is connected with the trigger rod by means of the cord $o$ until such locking lug and detent lever are released or disengaged—the detent lever being held yieldingly in locking position by means of a spring 34.

By this arrangement when the shock has been raised and the detent lever and shock suspending shaft are in the position shown in Fig. 5, such detent lever having been released from the keeper 24, a second tripping of such lever will throw it into the position indicated in Fig. 6 so as to release the locking shoulder 29 and permit the trigger rod to be raised to the position shown in Figs. 6 and 12. This raising of the trigger rod is accomplished by means of the actuating spring mechanism and cord or cable $o$, which raises the ring $t$ against the upper annular shoulder of the sleeve $u$ with such force as to raise the collar or ring $z$ out of engagement with the collapsible arms, thus permitting the arms to collapse and the shock supporting mechanism to be thrown out of engagement with the shock and raised a sufficient distance to permit the crane and shock supporting mechanism to be swung free of the shock back to their initial position over the revolving platform 35. The parts may then be lowered by releasing the mechanism hereinafter described which winds the actuating springs to a tension. The collapsible arms may be raised and the ring or collar z lowered into position to hold them extended,—the trigger rod and suspending frame or hollow tube both being thus returned to initial position and the locking lever mechanism into engagement with the keepers or locking shoulder and ready for the next operation.

In order to provide suitable means for connecting the actuating springs with the cables 16, o and p, suitable spring plates 15 and 17— already mentioned—are provided each consisting of a main body portion having a plurality of flanges 36, each of which is provided with a preferably open slot 37 for admitting the spring, such flanges forming hooks at the desired intervals around the outer edge of the plate so as to balance any desired number of springs which may be attached thereto. These spring plates are each provided also with a hook 38 on the flanged side thereof, and a loop 39 on the opposite side for receiving the cable, chain or other flexible element to be attached thereto. In making these plates, I prefer to make a blank from sheet metal of substantially the shape shown in dotted lines in Fig. 9 and bend the flanges perpendicular to the main body portion, as shown in Figs. 9 and 10.

When the detent lever mechanism is thrown from the position shown in Fig. 3 into releasing position, as shown in Fig. 4, so that the lower detent stud is out of engagement with the keeper on the crane head, it is desirable that means be provided for preventing the upper detent stud 32—already described—from releasing the locking shoulder 29 upon the trigger bar. An upwardly extending guard 40 is, therefore, provided mounted preferably upon the crane head on the side of the detent lever opposite the hook or keeper 24. A stud 41 upon this guard engages a projecting shoulder 42 upon the lower arm of the detent lever and as the latter is raised presses the upper detent stud safely into position upon the locking shoulder 29, so as to hold the trigger bar safely against the tension of the spring o. The detent lever is thus in position to be readily tripped in order to release the trigger bar and permit it to move upward with relation to the hollow shaft, so as to release or disengage the collapsible shock supporting arms from the collar which holds them in their extended position.

To provide suitable means for winding the actuating springs to the necessary tension to raise the shock suspending mechanism and thereby the weight of the shock automatically when desired, and to enable the spring winding mechanism to be thrown into and out of operative connection with the master-wheel or source of power, I provide a driven sprocket wheel 43, which is rotatably mounted upon a shaft 44 and connected by means of a sprocket chain 45 with the sprocket 46 upon the shaft 47 of the master-wheel 48,— the shaft 44 being rotatably mounted in suitable bearings 49 in the main frame of the machine. The spring winding sprocket may be connected with any desired suitable driven shaft of the machine, though I prefer to connect it as above set forth. A winding wheel 50 is mounted upon the same shaft with the winding or driven sprocket above described, and is preferably rotatable with such shaft, such winding wheel being preferably in the form of a fusee and having the cable 16—already mentioned—attached at the large end of the fusee and to the actuating springs, for raising the shock. This cable 16 extends through a guide 51 having an anti-friction pulley 52 for engaging the cable,—such guide being swiveled upon a plate 53, which forms a part thereof and which is in turn pivotally mounted by means of a pivot 54 upon a suitable support 55. The winding wheel or fusee is thus enabled to stretch the actuating springs more rapidly while the load is lightest upon the horses, which pull the machine, or in other words, during the time when there is the least amount of fodder in the shock carried by the machine. The speed of winding the springs gradually diminishes as the weight of the shock increases, and the winding of the springs is completed before the shock has attained any substantial weight.

In order to provide suitable means for quickly and efficiently connecting and disconnecting the winding wheel and winding sprocket, the winding wheel is provided with a connecting arm 56, in the form of a lever, pivotally mounted by means of a pivot 57 upon the side of such winding wheel adjacent to the driven sprocket wheel. One end of this connecting lever is provided with a shoulder 58 and an anti-friction roll 59, the other end being provided with a suitable handle 60 and spring mechanism 61 connected to the winding wheel by means of an eye 62. A guard 63, having shoulders 64 and 65 is also mounted upon the side of the winding wheel or fusee so as to limit the pivotal movement of this connecting lever arm. A stud 66 provided with an integral anti-friction wheel or roller portion 67 is mounted upon the sprocket wheel adjacent to the connecting lever arm above described, so that when such connecting arm is lowered into the position shown in Fig. 16 the stud will engage the shoulder 58 and cause the winding wheel or fusee to rotate with the sprocket wheel during such engagement of the parts.

To provide suitable means for throwing the connecting arm out of engagement with the stud 66, and thus disconnecting the winding wheel and sprocket wheel, a stop arm 68—shown in Fig. 2—is pivotally mounted in the frame of the machine upon a pivot 69 and provided with a suitable handle 70 at one end for operating such arm by hand when desired. A spring 71 is provided for holding the stop arm out of the path of movement of the anti-friction roll 59 upon the end of the lever 56. This stop arm is connected by means of a rod 72 with a treadle 73 by means of which it may be operated by the foot of the operator when desired.

When the swinging end 74 of the stop arm is moved down into the path of movement of the anti-friction roll 59 upon the connecting lever arm 56, the shoulder 58 of such lever will be thrown up out of engagement with the stud 66 upon the sprocket wheel and out of the path of such stud. The spring winding wheel or fusee is thus disconnected from the sprocket wheel and from the source of power. The actuating spring mechanism having been wound to a tension sufficient to enable it to raise the shock and the winding wheel disconnected from the source of power, as above set forth, it becomes necessary to provide means for holding the winding wheel against the tension of the springs. To accomplish this, a hand lever 75 is provided with a pawl 76, which engages ratchet teeth 77 upon the winding wheel, such hand lever being pivotally mounted upon a preferably flexible support 78 by means of a stud or pin 79; and a friction stud or arm 80 is mounted on this hand lever so as to engage the peripheral surface of the friction drum 81, which forms a part of the winding wheel, as shown in Fig. 16. The operator is thus enabled to hold the winding wheel against the tension of the actuating springs and release it when desired so as to lower the shock suspending mechanism to initial position. By holding the friction arm 80 against the drum 81, the speed of rotation of the winding wheel may be controlled as it operates in the direction necessary to lower the shock suspending mechanisms and release the actuating springs.

To provide suitable means for throwing the binding cord or twine and the shock compressing cord around the shock, a curved arm 82 is pivotally mounted upon a standard portion 83 of the main frame of the machine and provided with a suitable hook 84 for holding the pulley 85 in which is held the end of the binding cord or twine 88 and the shock compressing cord by means of which the shock is to be compressed and bound. The operator is thus enabled to throw the end of the shock compressing cord and the binding cord or twine around the shock a sufficient distance to enable him to reach them from the platform 89 so that he is not obliged to leave the machine in order to compress and bind the shock.

In operation, the crank and shock suspending mechanism are set in the position shown in Fig. 1 and the actuating springs wound to a tension, as shown in said figure. After the shock is built, the detent lever mechanism is tripped so as to permit the shock suspending mechanism to be raised to substantially the position shown in Fig. 5,—the lower parts of the suspending mechanism being in the relative position shown in Fig. 11. The shock is thus suspended at the desired height. The crane is then swung to the position shown in dotted lines in Fig. 2 and the detent lever mechanism tripped a second time by means of the same cord 25. The trigger rod with its shoulder 29 is thus permitted to rise to the position shown in Fig. 6, so as to release the collapsible arms n by raising the collar or ring z out of engagement therewith, as shown in Fig. 12. This permits the collapsible arms to fold downward or collapse so as to release the shock. The actuating spring at the same time raises the entire suspending mechanism out of engagement with the shock. The crane is then swung back to its original position and the parts returned to their initial position as already indicated.

I claim:—

1. In a machine of the class described, the combination of a crane, shock-suspending mechanism movably mounted thereon, locking shoulder mechanism upon one of such members, and detent mechanism mounted wholly upon the other member and movable into and out of engagement with such locking shoulder mechanism for preventing the upward movement of the shock-suspending mechanism when in engaging position and permitting its upward movement when in releasing position, substantially as described.

2. In a machine of the class described, the combination of a crane, shock-suspending mechanism movably mounted thereon, locking shoulder mechanism upon one of such members, detent mechanism mounted wholly upon the other member and movable into and out of engagement with such locking shoulder mechanism for preventing the upward movement of the shock-suspending mechanism when in engaging position and permitting its upward movement when in releasing position, means for raising such shock-suspending mechanism, and means for operating such detent mechanism, substantially as described.

3. In a machine of the class described, the combination of a crane, shock-suspending mechanism slidably mounted thereon and provided with means for engaging the shock, hook mechanism mounted upon one of such members, detent mechanism mounted wholly upon the other member movable into and out of engagement with such hook mechanism for preventing the upward movement of the shock-suspending mechanism when in engaging position and permitting its upward movement when in releasing position, and means for moving such detent mechanism into and out of engagement with the hook mechanism, substantially as described.

4. In a machine of the class described, the combination of a crane, shock-suspending mechanism slidably mounted thereon and provided with means for engaging the shock, hook mechanism mounted upon one of such members, detent lever mechanism mounted wholly upon the other member movable into and out of engagement with such hook mechanism for preventing the upward movement of the shock-suspending mechanism when in engaging position and permitting its upward movement when in releasing position, means for releasing such shock-suspending mechanism with relation to the crane, and means for operating such detent lever mechanism, substantially as described.

5. In a machine of the class described, the combination of a crane, shock-suspending mechanism comprising a hollow shaft slidably mounted thereon and provided with means for engaging the shock, a keeper mounted upon the crane, detent lever mechanism mounted wholly upon such shaft, and means for releasing the shock-supporting mechanism from engagement with the shock, substantially as described.

6. In a machine of the class described, the combination of a crane, shock-suspending mechanism movably mounted thereon and provided with means for engaging the shock, locking shoulder mechanism mounted upon one of such members, detent mechanism mounted upon the other member and movable into and wholly out of engagement with such locking shoulder, means for raising such shock-suspending mechanism, and means for disengaging the shock-suspending mechanism from the shock, substantially as described.

7. In a machine of the class described, the combination of a crane, shock-suspending mechanism movably mounted thereon and provided with means for engaging the shock, a trigger rod mounted upon such shock-suspending mechanism and connected with the means for engaging the shock, locking shoulder mechanism mounted upon such trigger rod, a keeper mounted upon the head portion of the crane, and detent mechanism mounted upon the suspending mechanism and movable into and out of engagement with such locking shoulder and keeper, substantially as described.

8. In a machine of the class described, the combination of a crane, shock-suspending mechanism movably mounted thereon and provided with means for engaging the shock, a trigger rod mounted upon such shock-suspending mechanism and connected with the means for engaging the shock, locking shoulder mechanism mounted upon such trigger rod, a keeper mounted upon the head portion of the crane, detent mechanism mounted upon the suspending mechanism and movable into and out of engagement with such locking shoulder and keeper, and a guard for limiting the movement of such detent mechanism, substantially as described.

9. In a machine of the class described, the combination of a crane, shock-suspending mechanism movably mounted thereon and provided with means for engaging the shock, a trigger rod mounted upon such shock-suspending mechanism and connected with the means for engaging the shock, locking shoulder mechanism mounted upon such trigger rod, a keeper mounted upon the head portion of the crane, detent lever mechanism mounted upon the suspending mechanism and movable into and out of engagement with such locking shoulder and keeper, a guard for limiting the movement of such detent lever mechanism, and a cord connected with such detent lever mechanism for operating it, substantially as described.

10. In a machine of the class described, the combination of a crane, shock-suspending mechanism movably mounted thereon and provided with mechanism for engaging the shock, trigger mechanism mounted upon such shock-suspending mechanism and connected with the mechanism for engaging the shock, locking shoulder mechanism mounted upon such trigger mechanism, a keeper mounted upon the head portion of the crane, and detent lever mechanism provided with a lever arm movable into and out of engagement with the keeper upon the head portion of the crane and having a detent arm provided with a stud movable into and out of engagement with the locking shoulder of the trigger mechanism, substantially as described.

11. In a machine of the class described, the combination of a crane, shock-suspending mechanism movably mounted thereon and provided with mechanism for engaging the shock, trigger mechanism mounted upon such shock-suspending mechanism and connected with the mechanism for engaging the shock, locking shoulder mechanism mounted upon such trigger mechanism, a keeper mounted upon the head portion of the crane, detent lever mechanism provided with a lever arm movable into and out of engagement with the keeper upon the head portion of the crane and having a detent arm provided with a stud movable into and out of engagement with the locking shoulder of the trigger mechanism, and means for operating such detent lever mechanism, substantially as described.

12. In a machine of the class described, the combination of a crane, shock-suspending mechanism movably mounted thereon having a head arranged above such crane and provided with means for engaging the shock, a trigger rod connected with the mechanism for engaging the shock and extending above the crane, a head mounted upon such trigger rod provided with a locking shoulder, a keeper mounted upon the head portion of the crane, and detent lever mechanism mounted upon the suspending mechanism and movable into and out of engagement with the shoulder of the trigger rod and the keeper upon the crane head, substantially as described.

13. In a machine of the class described, the combination of a crane, shock-suspending mechanism comprising a hollow shaft slidably mounted in the head portion of such crane and provided with means for engaging a shock, means for raising such shock-suspending mechanism, a trigger rod extending through such hollow shaft provided with a locking shoulder and connected with the mechanism for engaging the shock, a keeper mounted upon the head portion of the crane, detent mechanism mounted upon the shock-suspending mechanism and movable into and out of engagement with such keeper and the shoulder portion of such trigger rod, and means for raising such shock-suspending mechanism, substantially as described.

14. In a machine of the class described, the combination of shock-suspending mechanism having a flexible element provided with means for engaging the shock, a crane arm, a keeper upon one of such members, detent mechanism connected with the other member and movable into and wholly out of engagement with the keeper, and spring and winding wheel mechanism connected with such flexible element for raising the shock-suspending mechanism automatically when the detent mechanism is released, substantially as described.

15. In a machine of the class described, the combination of a crane arm, shock-suspending mechanism comprising a cable and provided with means for engaging the shock, spring mechanism connected with the cable for raising the shock-suspending mechanism, a winding wheel connected with such spring mechanism, a driven wheel connected with a suitable source of power and provided with a stud adjacent to the winding wheel, a connecting arm mounted upon the winding wheel and movable into and out of engagement with the stud for connecting and disconnecting such winding wheel and driven wheel, a stop arm movable into and out of engagement with the connecting lever upon such winding wheel, means for rotating the crane, and a swinging arm mounted in the frame of the machine and provided with a pulley removably attached thereto for carrying and tightening the shock-binding cords into position with relation to the shock, substantially as described.

16. In a machine of the class described, the combination of a crane arm, shock-suspending mechanism connected therewith and provided with means for engaging the shock, means for operating such shock-suspending mechanism, and a swinging arm pivotally mounted upon the frame of the machine and provided with means for removably holding shock-compressing and binding cords, substantially as described.

17. In a machine of the class described, the combination of a crane, shock suspending mechanism movably mounted thereon and provided with means for engaging the shock, locking mechanism mounted upon one of such members, detent mechanism mounted upon the other member and movable into and wholly out of engagement with the locking mechanism, means for raising the shock suspending mechanism, and means for disengaging the shock suspending mechanism from the shock, substantially as described.

JAMES E. SIMMONDS.

Witnesses:
HARRY I. CROMER,
WILLIAM PATTESON.